(12) United States Patent
Yamazaki et al.

(10) Patent No.: US 6,398,437 B1
(45) Date of Patent: Jun. 4, 2002

(54) KEYBOARD AND COMPUTER

(75) Inventors: Kazuhiko Yamazaki, Hiratsuka; Toshitaka Imai, Sagamihara; Hisashi Shima, Yamato, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/678,196

(22) Filed: Oct. 4, 2000

(30) Foreign Application Priority Data

Oct. 4, 1999 (JP) .......................................... 11-282432

(51) Int. Cl.⁷ ................................................. B41J 5/10
(52) U.S. Cl. ........................................ 400/489; 400/486
(58) Field of Search ................................. 400/489, 486, 400/485, 472, 693, 691; 341/22, 21, 27; D14/114, 115

(56) References Cited

U.S. PATENT DOCUMENTS

| 4,974,183 A | * 11/1990 | Miller ......................... 364/709 |
|---|---|---|
| 5,443,320 A | * 8/1995 | Agata et al. ................. 400/715 |
| 5,532,691 A | * 7/1996 | Honomizo .................... 341/22 |
| 5,675,360 A | * 10/1997 | Takegoshi et al. .......... 400/472 |
| 5,938,352 A | * 8/1999 | Chen ........................... 400/715 |
| 5,982,612 A | * 11/1999 | Roylance .................... 400/489 |
| 6,179,254 B1 | * 1/2001 | Min-Chen ................... 400/715 |

* cited by examiner

*Primary Examiner*—Andrew H. Hirshfeld
*Assistant Examiner*—Anthony H. Nguyen
(74) *Attorney, Agent, or Firm*—J. Bruce Schelkopf

(57) ABSTRACT

To provide a keyboard having a home position for control keys such as cursor keys.

A notebook personal computer includes a region in which a plurality of keys such as character keys and control keys are disposed and a palm rest 53 adjacent to the plurality of keys. Cursor keys 65, 67, 69, and 71, which belong to the control keys, are disposed adjacently to the palm rest and a slanted region 101 distinguishable by touch from the main surface of the palm rest is provided in a place adjacent to the cursor keys as their home position. Because the slanted region 101 is locatable with tactile sensation, the touch typing of the cursor keys is enabled.

4 Claims, 4 Drawing Sheets

[Figure 1]
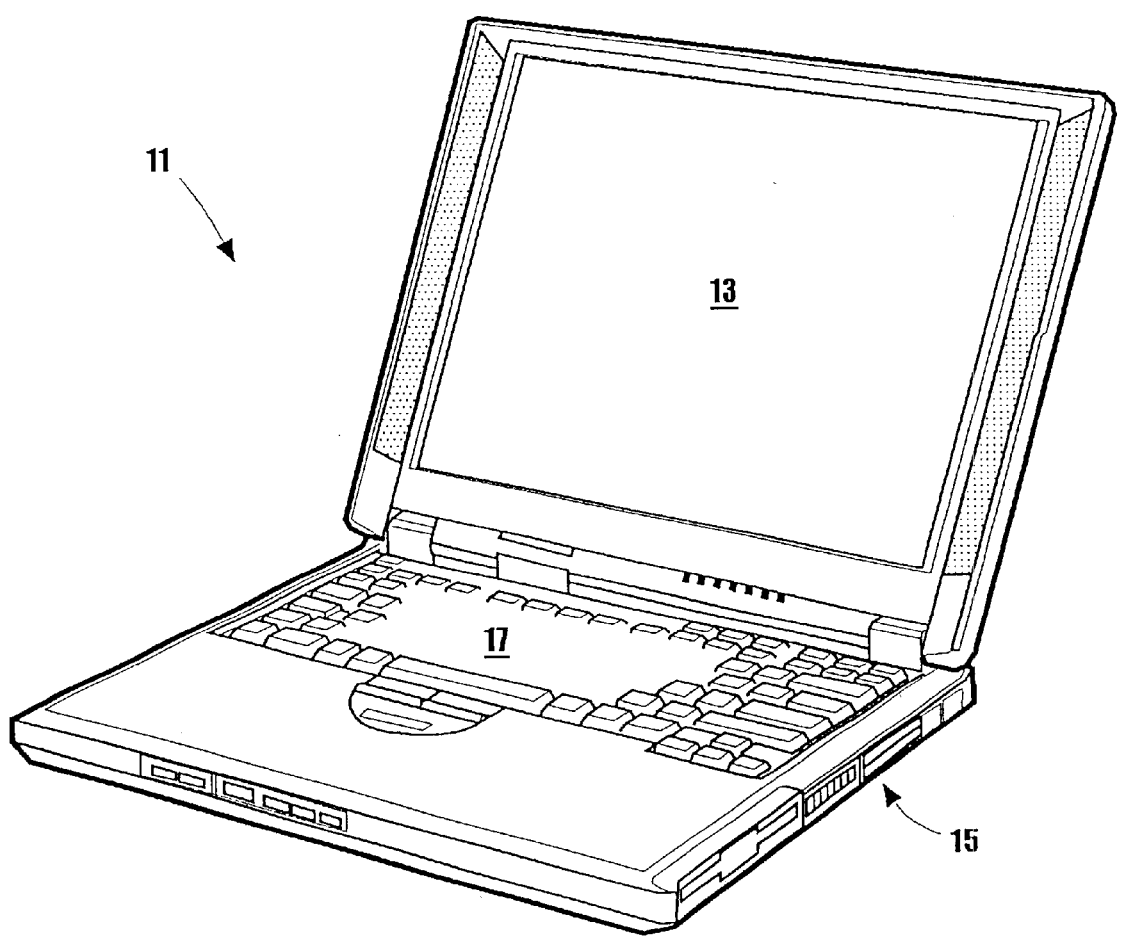

[Figure 2]
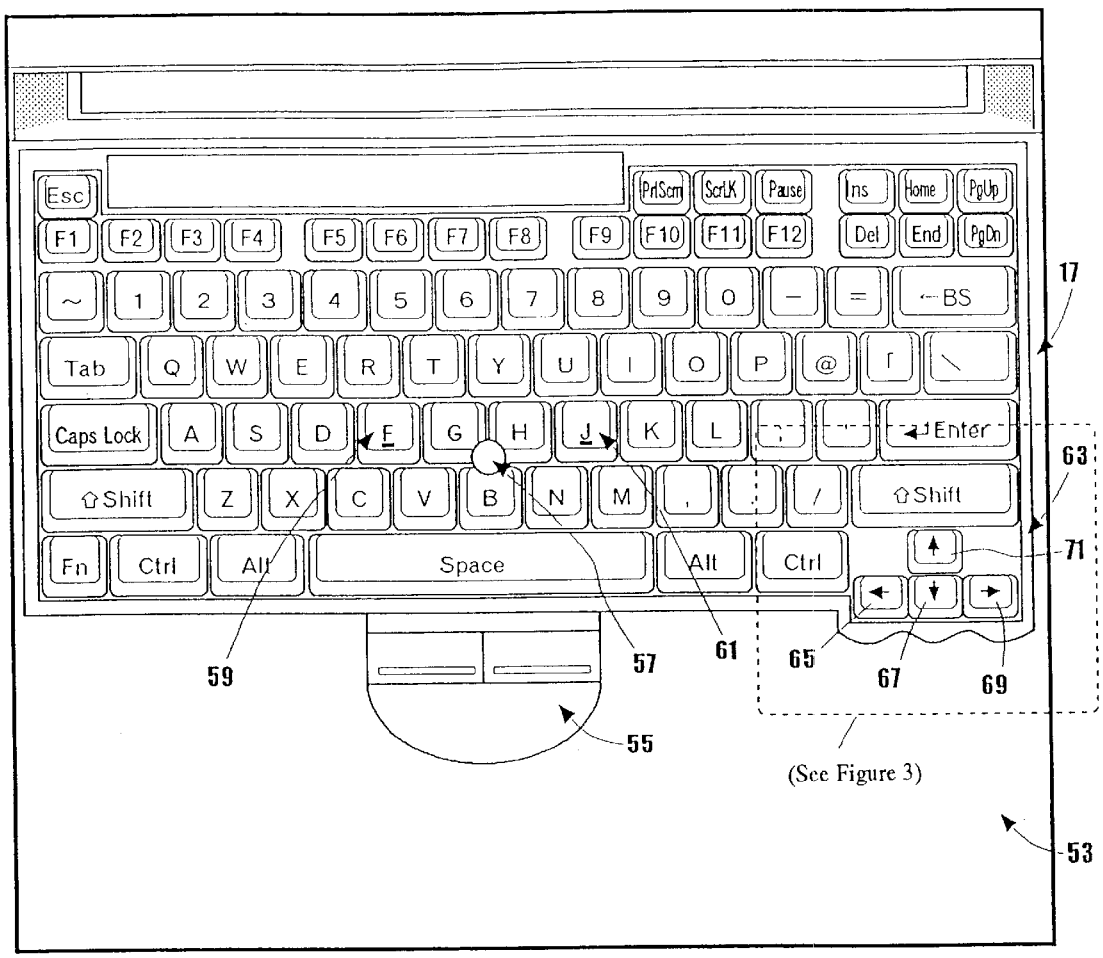

[Figure 3]
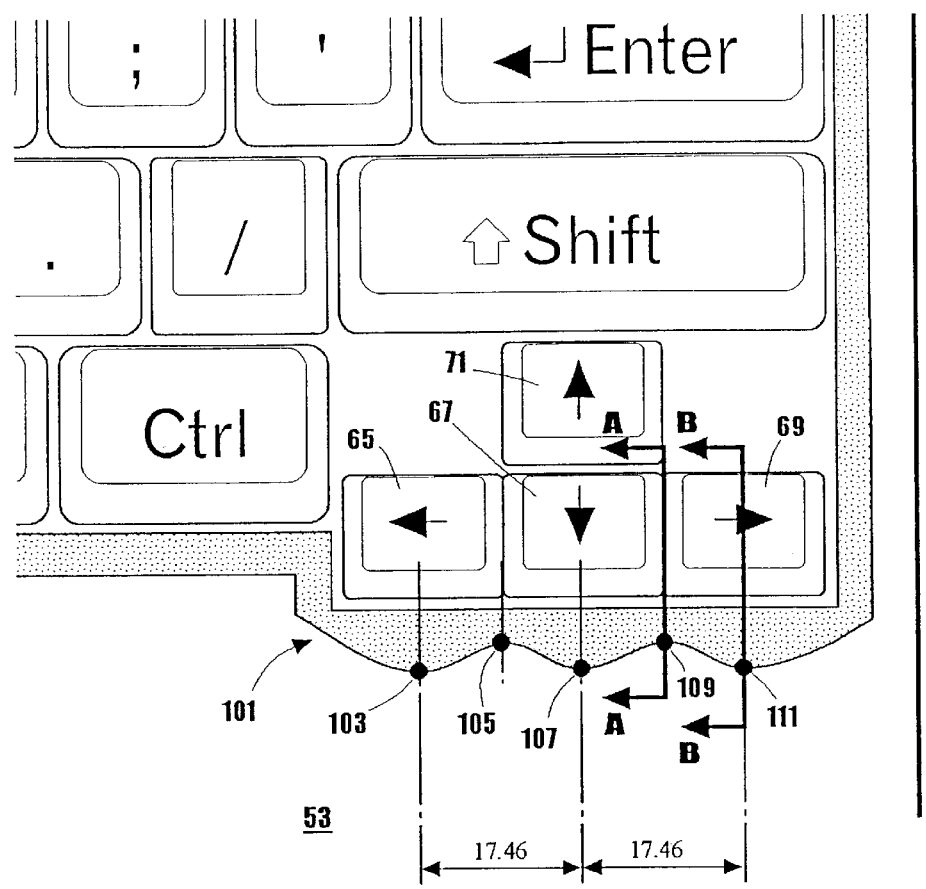

[Figure 4]
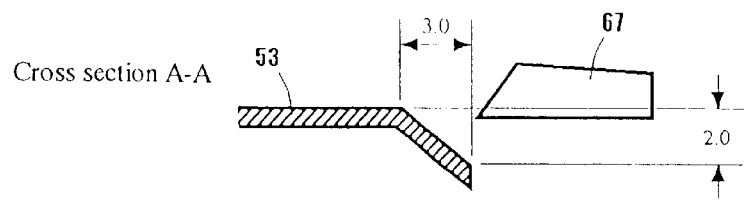
Cross section A-A
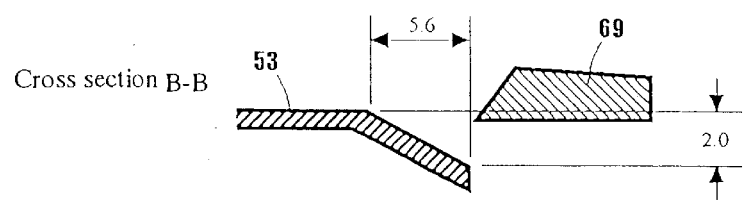
Cross section B-B
[Figure 5]
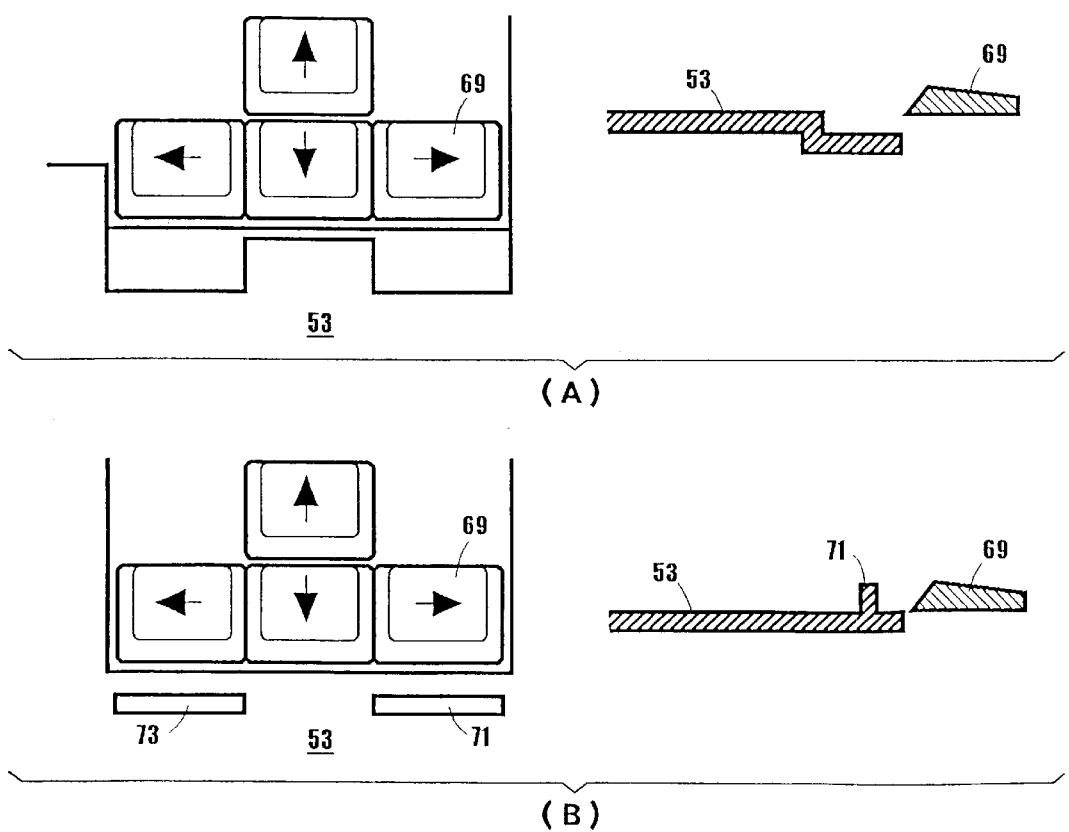
(A)
(B)

KEYBOARD AND COMPUTER

FIELD OF THE INVENTION

The present invention relates to a keyboard for computer with a user-friendly user interface, and in particular, to a keyboard and a computer having special keys or cursor keys with improved operability.

DESCRIPTION OF THE RELATED ART

A computer is often used by repeatedly exchanging information between the computer and the user in such a way that the computer provides information to the user by means of audio and images, the user inputs instructions and data for obtaining a desired result in response to the information, then the computer responds it by providing the internally processed result to the user. A keyboard is commonly used as means for the user to input information to the computer. Recently, demand for a keyboard that allows the user to input information quickly has grown as the processing speed of computers has increased dramatically.

The keyboard includes, character keys or data keys for inputting alphabets or Japanese syllabary characters, ten keys for inputting numeric characters, and, besides them, control keys or special keys to which special functions are assigned. The control keys include four cursor keys used to move the cursor displayed on the display screen. Ten keys are, however, not provided in notebook personal computers in order to save space. To input information from the keyboard quickly, the user should be allowed to concentrate on the display of the computer and documents. To do so, touch typing on blind typing in which the user types desired keys without looking at the keyboard is effective.

A small projection is formed on top of each of the character keys "F" and "J" and the ten key "5" to indicate the "home position" (hereinafter called the home position for character keys as appropriate), thereby allowing touch typing of the character keys and ten keys. The home position is a position where user's fingers are placed before typing. The user can identify the projection simply with tactile sensation to place the index finger of the left hand on the F key and the index finger of the right hand on the J key. Accordingly the index finger, middle finger, ring finger, and little finger of the left hand are placed on the F key, D key, S key, and A key, respectively, and the index finger, middle finger, ring finger, and little finger of the right hand are placed on the J key, K key, L key, and ";" key, respectively, in the home position for character keys.

Each finger is assigned to a key for keying. For example, the little finger of the left hand is assigned to the "1"key, "2" key, Q key, A key, and Z key and the index finger of the left hand is assigned to the "5" key, "6" key, R key, T key, F key, G key, V key, and B key. The user has learned the position of each key to be depressed by each finger with respect to the home position through training and can touch type without moving any one of the fingers of each hand off the home position. The touch typing of ten keys can also be performed similarly.

Each of the cursor keys, which belong to the control keys, bears an arrow on its top that pointing one of the four directions and used to move the cursor to the pointed direction. A cursor is a mark displayed on the screen for indicating the position at which a character or a graphic can be entered. In a separate standard keyboard for desktop computer, the position of the cursor key is apart from character keys and therefore the user must move all the fingers off the home position in order to access one of the cursor keys. The user therefore must take his/her eyes off the display screen or documents and look at the keyboard in order to visually locate the cursor key.

Cursor keys of a notebook personal computer typically are to the right of the character keys and can be depressed with the little finger of the right hand with the index finger of the right finger placed on the home position. However, because the little finger cannot exert a strong force and is clumsy compared with other fingers, it is uneasy to operate the cursor keys with the little finger with placing the index finger on the home position and therefore it is difficult for an untrained user to move the cursor on the display screen quickly. In addition, a user with a small right hand cannot reach all the cursor keys with the little finger with placing the index finger on the home position.

Therefore it is often the case that the user moves the right hand off the home position to operate the cursor keys with the deft index finger only or with the index finger, middle finger, and the ring finger. Because the user always moves the fingers off the home position to operate the cursor keys on a standard keyboard for desktop computer, the user adjusted to such an operation moves the hands while visually locating the cursor keys each time he/she operates the cursor keys on the notebook personal computer. The continuity of touch typing is thus lost by this cursor key operation.

A device is described in Published Unexamined Utility Model Application No. 3-9033 specification (creator of device: Yokoyama) in which a groove is provided in such a way that the little finger, the ring finger, the middle finger, and the index finger of the left hand are placed on the A key, S key, D key, and F key, respectively, and the index finger, the middle finger, the ring finger, and the little finger of the right hand are placed on the J key, K key, L key, and ";" key and the "4" key, "5" key, and "6" key of the ten-key, respectively, on the keyboard of a personal computer.

A keyboard is described in Published Unexamined Patent Application No. 8-123597 (inventor: Aiba) in which the cursor keys, which plays an important role in the Japanese kana-kanji conversion system, are placed in a position near the space key where they can be keyed with the thumbs with placing the fingers on the home position to improve the efficiency of typing Japanese characters.

A keyboard is described in Published Unexamined Utility Model Application No. 63-35131 specification (creator of device: Ishimochi et al.) in which the cursor keys are provided near the lower part of the character key section so that the cursor keys can be accessed with minimum movement of user's hands during the operation of the character key section.

SUMMARY OF THE INVENTION

It is an object of the present invention to provide a user-friendly keyboard and computer. It is another object of the present invention to provide a keyboard and a computer which do not impair the continuity of touch typing. It is another object of the present invention to provide a keyboard and a computer in which a home position is defined for operating control keys. It is yet another object of the present invention to provide a keyboard and a computer that can be used in a dark environment in which labels on the top of keys cannot be visually identified.

According to a first embodiment of the present invention, a home position region for control keys constituting a part of a plurality of keys is provided on a keyboard comprising a region in which the plurality of keys are disposed and a peripheral cover. Because the home position region for the control keys has a structure distinguishable from the main surface region of the peripheral cover with tactile sensation, touch typing can be maintained while operation is shifted from character keys to the control keys and returns to the home position for the character key after the operation of the control keys. The peripheral cover, which may have any other name, is a portion other than the keys, and has a boundary along the region in which the keys are disposed and a main surface region. The home position region only needs to have a structure distinguishable from the main surface region with tactile sensation and may be made tactilely distinguishable by applying surface treatment.

According to another embodiment of the present invention, cursor keys are chosen as the control keys. The cursor keys are frequently used and it is especially effective to provide a home position region for the cursor keys if they are disposed adjacent to the surrounding cover. According to yet another embodiment of the present invention, as the structure of the home position region, a wave-shaped slant may be provided in the peripheral cover correspondingly to the cursor keys to define the home position for the index finger, middle finger, and ring finger. The present invention is applicable to a separate keyboard as well as a notebook personal computer into which a keyboard is integrated.

BRIEF DESCRIPTION OF THE DRAWINGS

FIG. 1 shows an outline drawing of a notebook personal computer used as an example of an embodiment of the present invention;

FIG. 2 shows a top view of the system unit of the computer shown in FIG. 1;

FIG. 3 shows the home position for the cursor keys;

FIG. 4 shows cross-sectional views of FIG. 3; and

FIG. 5 shows another structure of the home position for the cursor keys.

DETAILED DESCRIPTION OF THE INVENTION

FIG. 1 shows an outline drawing of a notebook personal computer 11 to which an embodiment of the present invention is applied. The computer 11 may be ThinkPad ("ThinkPad" is a registered trade mark of IBM Corporation) available from IBM Corporation. A liquid crystal display 13, a system unit 15, and a keyboard section 17 mounted on the top of the system unit 15 are shown in FIG. 1.

FIG. 2 shows a top view of the system unit 15 of the computer 11 shown in FIG. 1. Shown in FIG. 2 are the keyboard section 17 consisting of a plurality of keys, a palm rest 53 on which use's palms are rested during keyboard operation, and three buttons 55 and a stick pointer 57 which constitute a pointing device. The keyboard section 17 comprises character keys, such as numeric keys and alphabet keys, and control keys disposed so as to surround the character keys. The key layout of the keyboard section 17 is an example of the layout used in ThinkPad, a notebook personal computer from IBM Corporation. While in practice some keys are labeled with two or more characters, only one character is indicated in the figure for simplicity. The scope of the present invention is not limited to the keyboard with the keyboard layout shown in FIG. 2.

The control key section includes a cursor key section 63 consisting of four cursor keys 65, 67, 69, and 71 labeled with arrows. The user can specify an input position on the display 13 by depressing one of the cursor keys to move the cursor or mouse pointer indicating the input position in a direction indicated by the arrow on that cursor key.

The palm rest 53 is disposed adjacently to the keyboard section 17 and constitutes part of the system unit 15. Its main surface is made of a substantially smooth plane. An Fn key, Ctrl key, Alt key, space key, Alt key, Ctrl key, "¬" key, "–" key, "®" key, which belong to the control keys, are disposed adjacently to the palm rest 53.

A projection is formed on the top of the F key 59 and the J key 61, thereby enabling the user to identify the home positions for the left hand and the right hand by touch, respectively, to automatically place the middle finger, the ring finger, and the little finger of the left hand on the D key, the S key, and the A key, respectively, and place the middle finger, the ring finger, and the little finger of the right hand on the K key, the L key, and the ";" key.

In the figure, it appears that the cursor keys can be accessed by the little finger of the right hand with the index finger of the right hand placed on the J key, that is, the home position, based on the sense of distance from the home position gained through training. However, this is an uneasy operation as described earlier. Therefore, in the case where the user needs to operate the cursor keys while typing on character keys, the user would move the right hand closer to the cursor key section 63, then depress the cursor keys with the index finger of the debt right hand or with the index finger, the middle finger and the ring finger of the right hand, and, after the operation of the cursor keys, return to the home position at the J key.

Because the fingers of the right hand are moved off the home positions of the character keys while the right hand is moved to the cursor keys on the prior-art keyboards, the user loses reference position for locating the keys learned through the sense and must visually locate the cursor keys in order to place the right hand correctly in the cursor key section.

In the computer 11 of the embodiment according to the present invention, a slanted region or home position 101 for the cursor keys which has a wave-shaped edge bounding the main surface of the palm rest is provided in a region of the main surface of the palm rest 53 formed on the top surface of the system unit 15 adjacent to the cursor keys 65, 67, and 69, as shown in FIG. 3. FIG. 4 shows cross sections taken on line A—A and line B—B in FIG. 3. The slanted region 101 is divided from the plane of the palm rest 53 by the wave-shaped boundary including projections and depressions 103, 105, 107, 109, and 111. The plane of the slanted region 101 constituting the palm rest which is defined by the wave-shaped boundary and adjacent to the cursor keys slants toward the bottom of the cursor keys as shown in FIG. 4. The dashed lines in FIG. 3 indicate the slanted plane formed by molding a thin plate constituting the palm rest. In the computer with the palm rest having the structure shown in FIGS. 3 and 4, even if the user moves the right hand off the home position of character keys in order to access the cursor keys, the user can know that the right hand is placed in the home position for the cursor keys by moving the right hand toward the cursor keys while perceiving the smooth surface of the palm rest 53 with the tactile sensation of the fingers of the right hand to locate the slanted region 101 before touching the cursor keys. In doing so, the user can correctly reach the home position for the cursor keys without visually locating the position of the cursor keys or mistakenly operating the cursor keys by accidentally touching the cursor keys.

The three keys 65, 67, and 69 are disposed in the lower row and the key 71 is disposed in the upper row of the cursor key section 63. According to the embodiment, the slanted region 101 is made up of three waves. The depressions 103, 107, and 111 of the wave-shaped boundary correspond to the keys, 65, 67, and 69, respectively. When the cursor keys are operated with the three fingers of the right hand, the index finger, the middle finger, and the ring finger are placed in the depressions 103, 107, and 111, respectively, so that the slanted plane of the slanted region 101 can be tactilely perceived with the tip of each finger. When the cursor keys are depressed with the index finger only, the user can identify by touch rather than visually which of the depressions 103, 107, and 109 is the finger on, and therefore which cursor key is the finger accessing, by sliding the finger over the wave-shaped boundary 103, 105, 107, 109, 111.

When the cursor keys are depressed in series, the cursor keys can be touch-typed by using the depressions 103, 107, and 111 as the home position. After the completion of the cursor key operation, the right hand can be placed at the home position for character keys by tactilely locating the projection on the J, therefore the continuity of touch typing is not lost when cursor key operation is required during typing on character keys.

The keyboard structure according to the embodiment is suitable for a computer used in an environment in which ambient lighting is inadequate, such as those in airplanes, because the cursor keys can be located tactilely without visually identifying keytop labels.

While the present invention has been described with respect to the specific embodiment, the scope of the present invention is not limited to the above-described embodiment, instead, the present invention has various applications within the spirit of the present invention. While the present invention has been described with respect to the home position for the cursor keys by way of example, the spirit of the present invention is not limited to the embodiment, instead, the present invention can be applied to any control key. Furthermore, the number of home positions of the control keys according to the present invention is not limited to one, instead, a plurality of home positions may be provided, including those for control keys operated by the left hand. While the present invention has been describe with respect to the keyboard for notebook personal computer by way example, the present invention can be applied to a separate keyboard for desktop computer.

The shape of the home position is not limited to the slanted thin plate constituting the palm rest and any structure distinguishable from the main surface of the palm rest with tactile sensation may be used. For example, a recess may be provided in the palm rest as shown in FIG. 5(A), or a projection 71 which is a member separate from the palm rest may be bonded to the palm rest as shown in FIG. 5(B). The home position may be formed flush with the surface of the palm rest by applying surface treatment different from that of the palm rest for enabling the difference between them to be tactilely perceived.

The present invention enabled a user-friendly computer and computer to be provided. In addition, the present invention enabled a keyboard and a computer in which the continuity of touch typing is not lost. Furthermore, the present invention enabled a keyboard and a computer to be provided in which the home position for control key operation. Furthermore, the present invention enabled a keyboard and a computer to be provided which can be used in a dark environment in which the label on the keytops cannot be visually identified.

What is claimed is:

1. A keyboard for a computer comprising: a region in which a plurality of keys including a control key are disposed; a peripheral cover including a main surface region defining a part of a boundary along said control key; and a home position region distinguishable from said main surface region with tactile sensation, said home position region being located in a place in said main surface region adjacent to said control key; wherein an "n" number of said cursor keys are disposed adjacently to said peripheral cover and an "n" number of wave shapes of said home position region are formed, each of said wave shapes corresponding to each of said cursor keys.

2. The keyboard for a computer according to claim 1, wherein said "n" is equal to 3.

3. A notebook personal computer, comprising: a display, and a system unit having on top of said system unit a palm rest and a keyboard, wherein said palm rest includes said peripheral cover, and wherein said keyboard comprises a region in which a plurality of keys including a control key are disposed, said peripheral cover including a main surface region defining a part of a boundary along said control key; and a home position region distinguishable from said main surface region with tactile sensation, said home position region being located in a place in said main surface region adjacent to said control key;

wherein an "n" number of said cursor keys are disposed adjacently to said peripheral cover and an "n" number of wave shapes of said home position region are formed, each of said wave shapes corresponding to each of said cursor keys.

4. The computer according to claim 3, wherein said "n" is equal to 3.

* * * * *